US008532201B2

(12) United States Patent
Park et al.

(10) Patent No.: US 8,532,201 B2
(45) Date of Patent: Sep. 10, 2013

(54) METHODS AND APPARATUS FOR IDENTIFYING A PREAMBLE SEQUENCE AND FOR ESTIMATING AN INTEGER CARRIER FREQUENCY OFFSET

(75) Inventors: Jong Hyeon Park, San Jose, CA (US); Ju Won Park, San Ramon, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 929 days.

(21) Appl. No.: 11/955,062

(22) Filed: Dec. 12, 2007

(65) Prior Publication Data

US 2009/0154627 A1    Jun. 18, 2009

(51) Int. Cl.
*H04K 1/10* (2006.01)
(52) U.S. Cl.
USPC ........... 375/260; 375/262; 375/267; 375/316; 375/339; 375/343
(58) Field of Classification Search
USPC ............... 375/130, 150, 219, 229, 260, 262, 375/267, 316, 319, 322, 326, 339, 343, 330
See application file for complete search history.

(56) References Cited

U.S. PATENT DOCUMENTS

| | | | |
|---|---|---|---|
| 5,852,630 A * | 12/1998 | Langberg et al. ............. | 375/219 |
| 6,208,695 B1 | 3/2001 | Klank et al. | |
| 6,219,333 B1 | 4/2001 | Ahn | |
| 6,363,084 B1 | 3/2002 | Dejonghe | |
| 6,707,856 B1 | 3/2004 | Gardner et al. | |
| 6,807,241 B1 | 10/2004 | Milbar et al. | |
| 6,959,050 B2 | 10/2005 | Baum et al. | |
| 7,039,581 B1 | 5/2006 | Stachurski et al. | |
| 7,058,147 B2 | 6/2006 | Erving et al. | |
| 7,116,745 B2 | 10/2006 | Fanson et al. | |
| 7,203,245 B1 | 4/2007 | Murphy | |
| 7,236,554 B2 | 6/2007 | Gupta | |
| 7,251,282 B2 | 7/2007 | Maltsev et al. | |
| 7,423,984 B2 * | 9/2008 | Hasegawa et al. ............ | 370/282 |

(Continued)

FOREIGN PATENT DOCUMENTS

| | | |
|---|---|---|
| CN | 1879321 A | 12/2006 |
| EP | 1424789 A1 | 6/2004 |

(Continued)

OTHER PUBLICATIONS

International Search Report/US08/052720, International Search Authority—European Patent Office-Aug. 6, 2008.

(Continued)

*Primary Examiner* — Hirdepal Singh
(74) *Attorney, Agent, or Firm* — Tyler J. Overall

(57) ABSTRACT

In accordance with a method for identifying a preamble sequence and for estimating an integer carrier frequency offset, a signal that comprises a preamble sequence from a set of possible preamble sequences is received. A reduced set of integer carrier frequency offset (CFO) candidates may be determined. Cross-correlation operations may be performed with respect to the received signal and multiple candidate transmitted signals. Each candidate transmitted signal may include one of the set of possible preamble sequences. In addition, each candidate transmitted signal may correspond to one of the reduced set of integer CFO candidates. Multiple correlation values may be determined as a result of the cross-correlation operations. The correlation values may be used to identify the preamble sequence and to estimate the integer CFO.

40 Claims, 12 Drawing Sheets

(56) References Cited

U.S. PATENT DOCUMENTS

| | | | |
|---|---|---|---|
| 7,502,311 B2 | 3/2009 | Song et al. | |
| 7,577,210 B2 | 8/2009 | Lee | |
| 7,813,442 B2* | 10/2010 | Gaikwad | 375/267 |
| 7,894,539 B2* | 2/2011 | Lin et al. | 375/260 |
| 8,045,636 B1* | 10/2011 | Lee et al. | 375/262 |
| 8,107,561 B2* | 1/2012 | Huang et al. | 375/326 |
| 2004/0246998 A1 | 12/2004 | Ma et al. | |
| 2006/0062196 A1 | 3/2006 | Cai et al. | |
| 2006/0071851 A1 | 4/2006 | Graas et al. | |
| 2006/0078040 A1 | 4/2006 | Sung et al. | |
| 2006/0133321 A1 | 6/2006 | Lim et al. | |
| 2006/0233097 A1 | 10/2006 | Vrcelj et al. | |
| 2006/0239179 A1 | 10/2006 | Berkeman et al. | |
| 2006/0245349 A1* | 11/2006 | Vrcelj et al. | 370/210 |
| 2007/0058693 A1 | 3/2007 | Aytur et al. | |
| 2007/0280098 A1* | 12/2007 | Bhatt et al. | 370/208 |
| 2008/0101495 A1* | 5/2008 | Gaikwad | 375/267 |
| 2008/0107200 A1 | 5/2008 | Zhu et al. | |
| 2008/0107220 A1 | 5/2008 | Park et al. | |
| 2009/0060101 A1* | 3/2009 | Liu | 375/344 |
| 2009/0175394 A1 | 7/2009 | Park et al. | |
| 2010/0128630 A1* | 5/2010 | Barak et al. | 370/254 |
| 2011/0293040 A1* | 12/2011 | Dupont et al. | 375/316 |

FOREIGN PATENT DOCUMENTS

| | | |
|---|---|---|
| EP | 1755299 | 2/2007 |
| JP | 2000151528 A | 5/2000 |
| JP | 2001237754 A | 8/2001 |
| JP | 2002368717 A | 12/2002 |
| JP | 2006180518 A | 7/2006 |
| JP | 2008503186 A | 1/2008 |
| JP | 2008236744 A | 10/2008 |
| RU | 2149509 | 5/2000 |
| RU | 2157592 | 10/2000 |
| RU | 2168278 | 5/2001 |
| RU | 2221330 C2 | 1/2004 |
| RU | 2232469 C2 | 7/2004 |
| RU | 2233033 | 7/2004 |
| RU | 2295842 | 3/2007 |
| WO | WO9610873 | 4/1996 |
| WO | WO9635268 | 11/1996 |
| WO | WO9849857 A1 | 11/1998 |
| WO | WO 0035117 | 6/2000 |
| WO | WO02080600 A1 | 10/2002 |
| WO | WO2005101780 A1 | 10/2005 |
| WO | 2005122717 A2 | 12/2005 |
| WO | WO2006115368 A1 | 11/2006 |
| WO | 2007138453 | 12/2007 |
| WO | WO2007138456 A2 | 12/2007 |

OTHER PUBLICATIONS

Written Opinion-PCT/US08/052720, International Search Authority—European Patent Office-Aug. 6, 2008.
IEEE, "Air Interface for Fixed Broadband Wireless Access System," Draft Standard, May 2004, 915 pages, P802.16-REVd/D5-2004, Part 16, New York, New York.
IEEE, "Corrigendum to IEEE Standard for Local and Metropolitan Area Networks—Part 16: Air Interface for Fixed Broadband Wireless Access Systems," Draft Standard, Sep. 12, 2005, 288 pages, P802.16/2004/Cor1/D5, New York, New York.
IEEE, "Part 16: Air Interface for Fixed Broadband Wireless Access Systems. Amendment for Physical and Medium Access Control Layers for Combined Fixed and Mobile Operation in Licensed Bands," Draft Standard, Oct. 14, 2005, 684 pages, P802.16e/D12, New.
Jiho Jang et al., "A Common SYNC Symbol for FFT sizes other than 2048", Publication, Aug. 27, 2004 and Sep. 20, 2004, 8 pages, IEEE 802.16 Broadband Wireless Access Working Group.
Bhatt T., et al., "Initial Synchronization for 802.16e Downlink," Fortieth Asilomar Conference on Signals, Systems and Computers, 2006. ACSSC '06. pp. 701-706, (Oct. 1, 2006); ACSSC.2006.354839; XP031081135, ISBN: 978-1-4244-0784-2.
Kang et al., "Robust OFDMA Frame Synchronization Algorithm on Inter-Cell Interference," 2006 Asia-Pacific Conference on Communications, Aug. 1, 2006, pp. 1-5, ISSN : 978-1-4244-0573-2.
Manusani, S. K. et al.: "Robust Time and Frequency Synchronization in OFDM based 802.11a WLAN Systems,"Annual India Conference, 2006, IEEE, PI, Sep. 1, 2006, pp. 1-4, XP031042626, ISBN: 978-1-4244-0369-1.
Um et al., "A Robust Timing Synchronization Algorithm for OFDM Systems over Multipath Rayleigh Fading Channels," IEICE Transactions on Fundamentals of Electronics, Communications and Computer Sciences, Jun. 1, 2006, pp. 1705-1709, vol. E89-A, No. 6, Engineering Sciences Society, Tokyo, JP, XP001243110.
Taiwan Search Report—TW097104264—TIPO—Oct. 9, 2012.

* cited by examiner

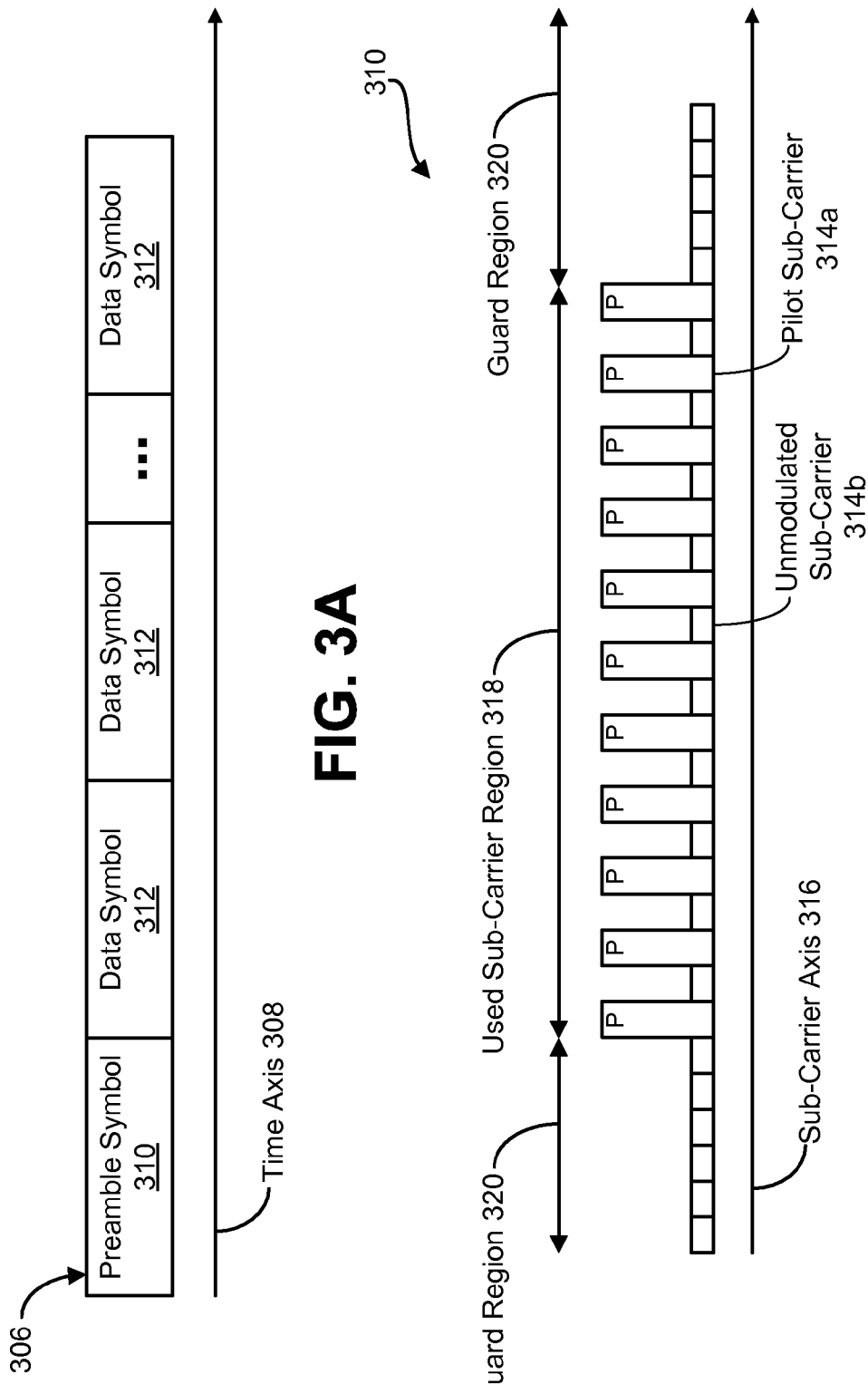

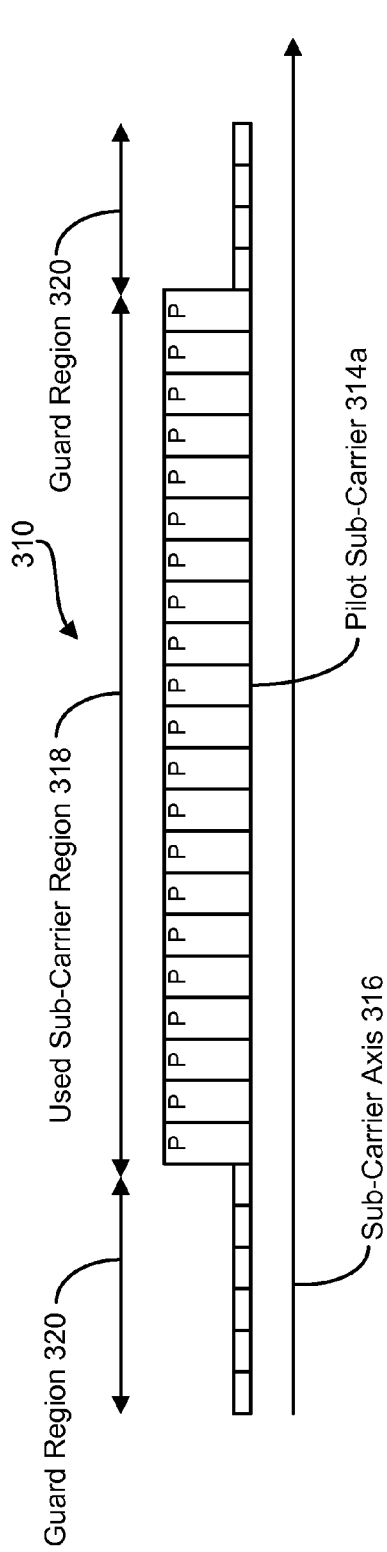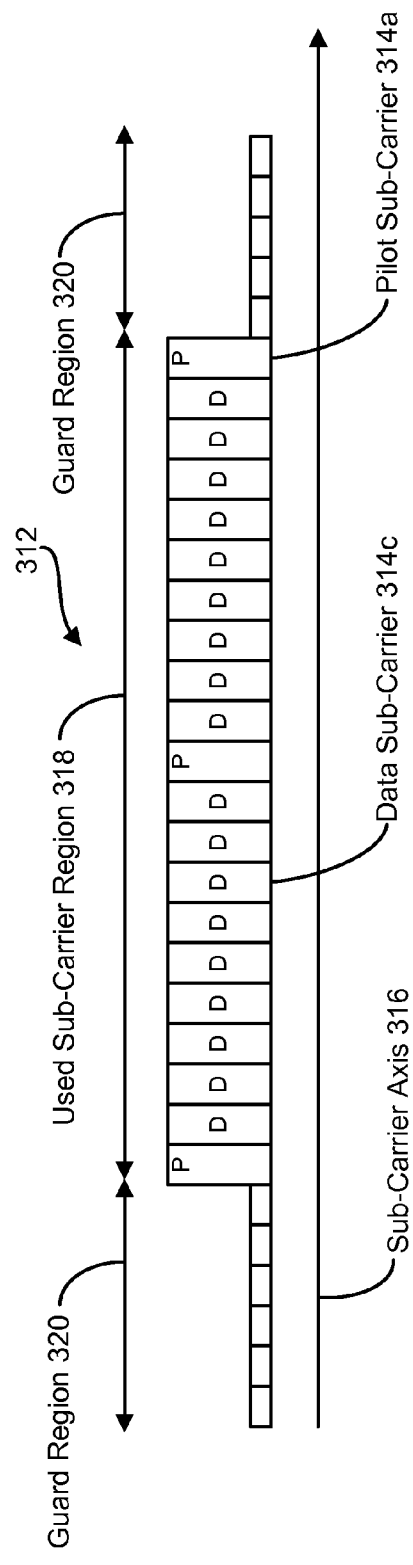

| Index | IDcell | Segment | Series to modulate (in hexadecimal format) |
|---|---|---|---|
| 0 | 0 | 0 | 0xA6F294371 9285E1844677D133E4D52CCB1F182DE00489E53E6B6E77063C7EE7D0AD8EAF |
| 1 | 1 | 0 | 0x068321CBBE7F462E6C2A07E8BBDA2C7F7946D5F69E33AC8ACF7D84AB4A33C467001F3B2 |
| 2 | 2 | 0 | 0x1C73D30B2DF72CEC9117A0BED8EAF8E05024 61FC0F456AC906AD E03E9B5AB5E1D3F98C6E |
| 3 | 3 | 0 | 0x5F9A2E5CA7CC69A5227184FB1CC2262809F3B19D0543B9BFFDA 4A73A704608d9F9E8D3D |

FIG. 5A

| Index | IDcell | Segment | Series to modulate (in hexadecimal format) |
|---|---|---|---|
| 0 | 0 | 0 | 0x66C9CB4D1C8F31D86F5795886EE02FF6BE4 |
| 1 | 1 | 0 | 0xD8C30DA58B5ED71056C5D796032B80E835522C |
| 2 | 2 | 0 | 0x8E B82664E3B2052221DE18E9000561F25A.AFC |
| 3 | 3 | 0 | 0x3B322996987C257CD31C67E4AA3DD697E0E08 |

METHODS AND APPARATUS FOR IDENTIFYING A PREAMBLE SEQUENCE AND FOR ESTIMATING AN INTEGER CARRIER FREQUENCY OFFSET

TECHNICAL FIELD

The present disclosure relates generally to wireless communication systems. More specifically, the present disclosure relates to methods and apparatus for identifying a preamble sequence and for estimating an integer carrier frequency offset in a wireless communication system.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

As indicated above, the present disclosure relates generally to wireless communication systems. More specifically, the present disclosure relates to methods and apparatus for identifying a preamble sequence and for estimating an integer carrier frequency offset in a wireless communication system.

BRIEF DESCRIPTION OF THE DRAWINGS

FIGS. 3A through 3D illustrate an example of a frame structure for an OFDM/OFDMA system;

FIGS. 5A and 5B illustrate examples of preamble sequences that may be defined for an OFDM/OFDMA system;

FIG. 9 illustrates an example of a virtual segment table; and

SUMMARY

Figure 1:
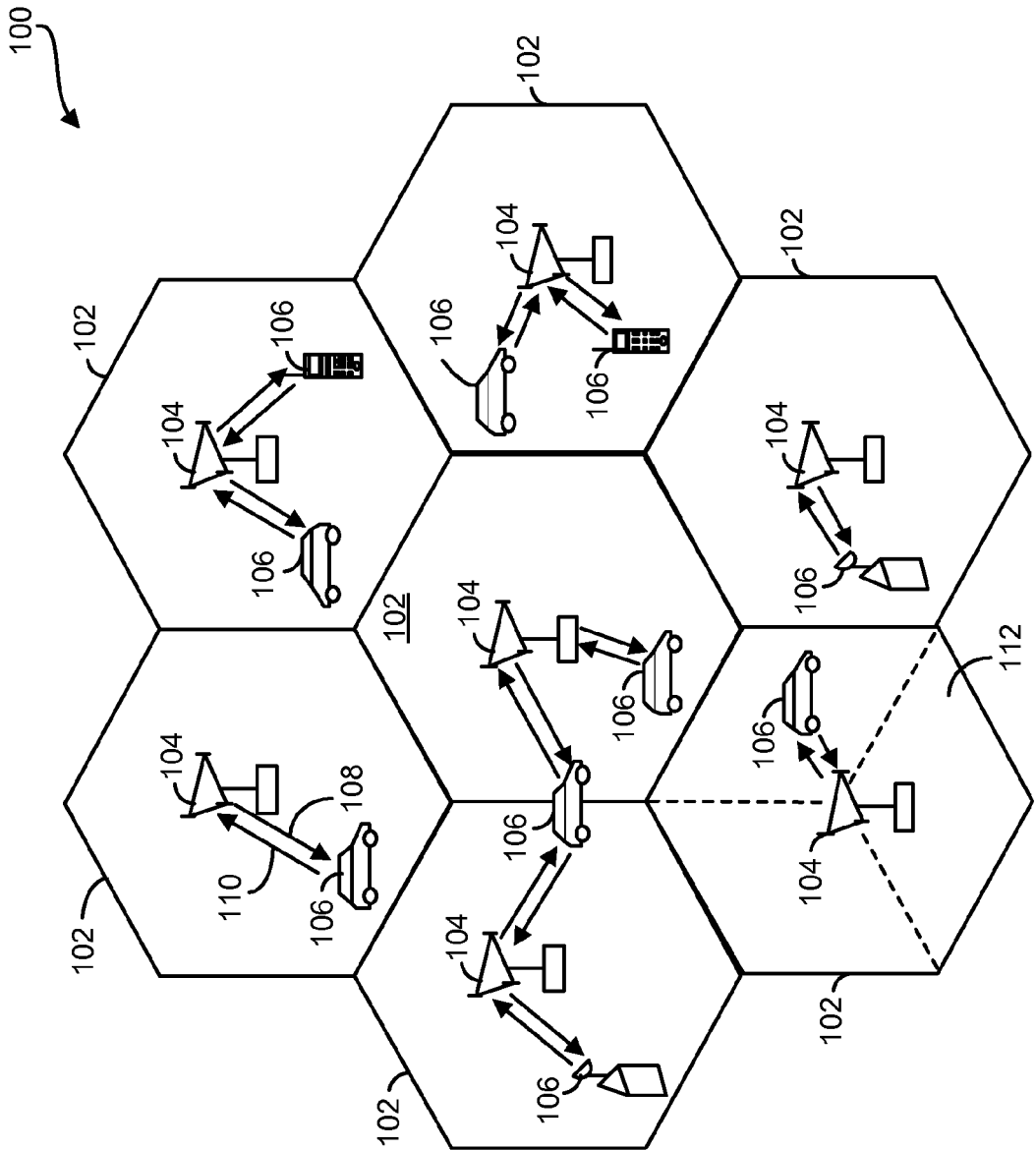
FIG. 1 illustrates an example of a wireless communication system.

A method for identifying a preamble sequence and for estimating an integer carrier frequency offset is disclosed. The method may include determining a reduced set of integer carrier frequency offset (CFO) candidates corresponding to a received signal that includes a preamble sequence from a set of possible preamble sequences. The method may also include performing correlation operations with respect to the received signal and multiple candidate transmitted signals. Each candidate transmitted signal may include one of the set of possible preamble sequences. Each candidate transmitted signal may correspond to one of the reduced set of integer CFO candidates. Correlation values may be determined as a result of the correlation operations. The method may also include using the correlation values to identify the preamble sequence and to estimate the integer CFO.

A wireless device that is configured to identify a preamble sequence and to estimate an integer carrier frequency offset is also disclosed. The wireless device may include a processor and memory in electronic communication with the processor. Instructions may be stored in the memory. The instructions may be executable to determine a reduced set of integer carrier frequency offset (CFO) candidates corresponding to a received signal that includes a preamble sequence from a set of possible preamble sequences. The instructions may also be executable to perform correlation operations with respect to the received signal and multiple candidate transmitted signals. Each candidate transmitted signal may include one of the set of possible preamble sequences. Each candidate transmitted signal may correspond to one of the reduced set of integer CFO candidates. Correlation values may be determined as a result of the correlation operations. The instructions may also be executable to use the correlation values to identify the preamble sequence and to estimate the integer CFO.

An apparatus that is configured to identify a preamble sequence and to estimate an integer carrier frequency offset is also disclosed. The apparatus may include means for determining a reduced set of integer carrier frequency offset (CFO) candidates corresponding to a received signal that includes a preamble sequence from a set of possible preamble sequences. The apparatus may also include means for performing correlation operations with respect to the received signal and multiple candidate transmitted signals. Each candidate transmitted signal may include one of the set of possible preamble sequences. Each candidate transmitted signal may correspond to one of the reduced set of integer CFO candidates. Correlation values may be determined as a result of the correlation operations. The apparatus may also include means for using the correlation values to identify the preamble sequence and to estimate the integer CFO.

A computer-program product for identifying a preamble sequence and for estimating an integer carrier frequency offset is also disclosed. The computer-program product includes a computer readable medium having instructions thereon. The instructions may include code for determining a reduced set of integer carrier frequency offset (CFO) candidates corresponding to a received signal that includes a preamble sequence from a set of possible preamble sequences. The instructions may also include code for performing correlation operations with respect to the received signal and multiple candidate transmitted signals. Each candidate transmitted signal may include one of the set of possible preamble sequences. Each candidate transmitted signal may correspond to one of the reduced set of integer CFO candidates. Correlation values may be determined as a result of the correlation operations. The instructions may also include code for using the correlation values to identify the preamble sequence and to estimate the integer CFO.

DETAILED DESCRIPTION

The methods and apparatus of the present disclosure may be utilized in a broadband wireless communication system. The term "broadband wireless" refers to technology that provides high-speed wireless, voice, Internet, and data network access over a wide area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique in which users are assigned sub-carriers in different time slots. OFDMA is a flexible multiple-access technique that can accommodate many users with widely varying applications, data rates, and quality of service requirements.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 October 2005" in October 2005 for mobile BWA systems. Those two standards defined four different physical layers (PHYs) and one medium access control (MAC) layer. The OFDM and OFDMA PHY of the four PHYs are the most popular in the fixed and mobile BWA areas respectively.

Certain aspects of the present disclosure will be described in relation to BWA systems based on OFDM/OFDMA technology. However, the scope of the present disclosure is not limited to such systems. The methods and apparatus disclosed herein may be utilized in other types of wireless communication systems.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with remote stations 106. The base station 104 may alternatively be referred to as an access point, a Node B, or some other terminology.

FIG. 1 shows various remote stations 106 dispersed throughout the system 100. The remote stations 106 may be fixed (i.e., stationary) or mobile. The remote stations 106 may alternatively be referred to as user terminals, access terminals, terminals, subscriber units, mobile stations, stations, etc. The remote stations 106 may be wireless devices, cellular phones, personal digital assistants (PDAs), handheld devices, wireless modems, laptop computers, personal computers, etc.

A variety of algorithms and methods may be used for transmissions in the wireless communication system 100 between the base stations 104 and the remote stations 106. For example, signals may be sent and received between the base stations 104 and the remote stations 106 in accordance with OFDM/OFDMA techniques. If this is the case, the wireless communication system 100 may be referred to as an OFDM/OFDMA system 100.

A communication link that facilitates transmission from a base station 104 to a remote station 106 may be referred to as a downlink 108, and a communication link that facilitates transmission from a remote station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within an OFDM/OFDMA system 100 may utilize antennas that concentrate the flow of power within a particular sector 112 of the cell 102. Such antennas may be referred to as directional antennas.

Figure 2:
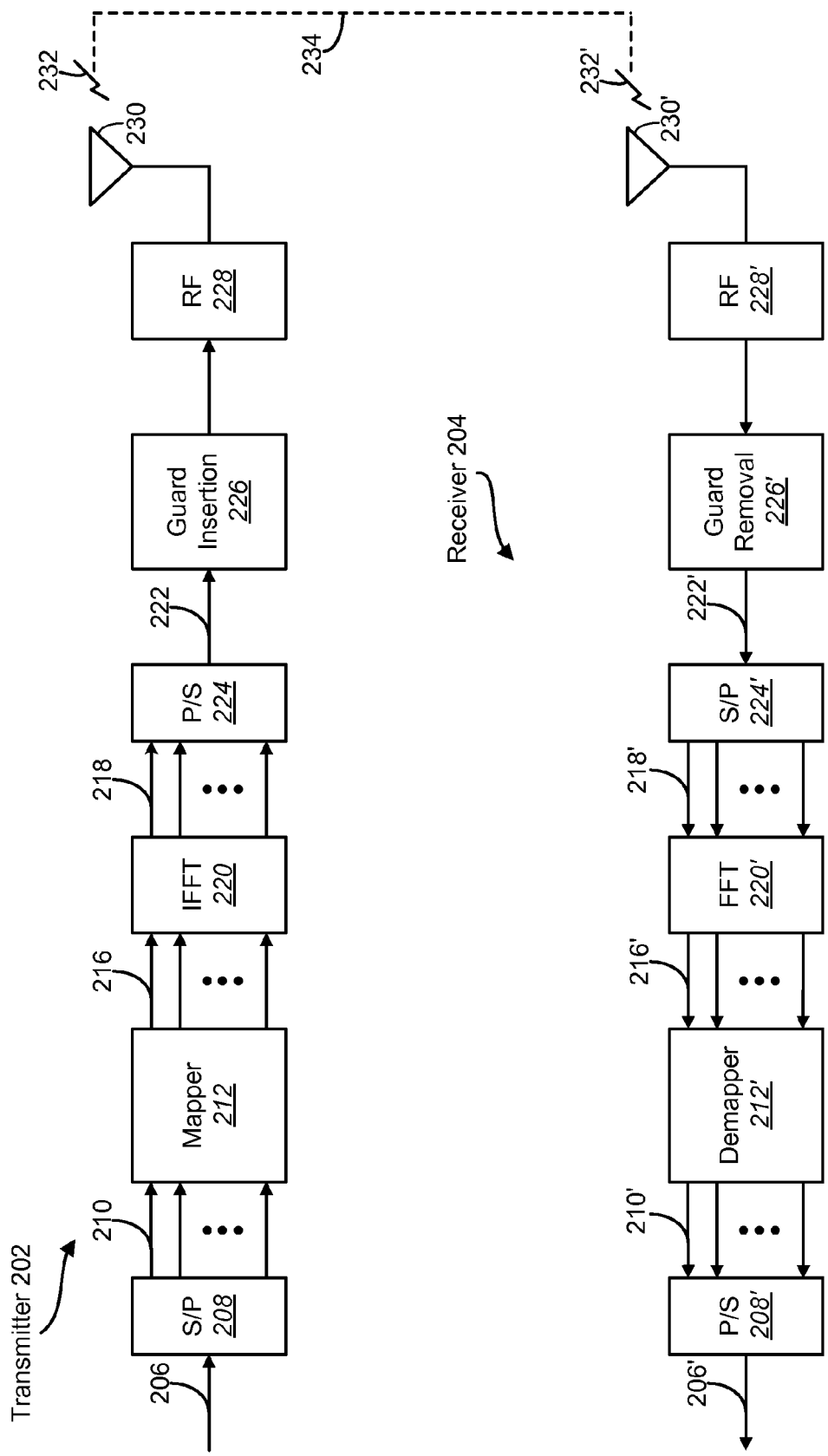
FIG. 2 illustrates an example of a transmitter and an example of a receiver for an OFDM/OFDMA system.

FIG. 2 illustrates an example of a transmitter 202 for an OFDM/OFDMA system 100. The transmitter 202 may be implemented in a base station 104, for transmitting data to a remote station 106 on a downlink 108. The transmitter 202 may also be implemented in a remote station 106, for transmitting data to a base station 104 on an uplink 110.

Data 206 to be transmitted is shown being provided as input to a serial-to-parallel (S/P) converter 208. The S/P converter 208 splits the transmission data into N parallel data streams 210.

The N parallel data streams 210 may then be provided as input to a mapper 212. The mapper 212 maps the N parallel data streams 210 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 212 outputs N parallel symbol streams 216, each symbol stream 216 corresponding to one of the N orthogonal sub-carriers. These N parallel symbol streams 216 are represented in the frequency domain, and may be converted into N parallel time domain sample streams 218 by an inverse fast Fourier transform (IFFT) component 220.

The N parallel time domain sample streams 218 may be converted into a serial stream of OFDM/OFDMA symbols 222 by a parallel-to-serial (P/S) converter 224. A guard insertion component 226 may insert a guard interval between successive OFDM/OFDMA symbols in the OFDM/OFDMA symbol stream 222. The output of the guard insertion component 226 may then be upconverted to a desired transmit frequency band by a radio frequency (RF) front end 228. An antenna 230 may then transmit the resulting signal 232.

FIG. 2 also illustrates an example of a receiver 204 for an OFDM/OFDMA system 100. The receiver 204 may be implemented in a remote station 106, for receiving data from a base station 104 on a downlink 108. The receiver 204 may also be implemented in a base station 104, for receiving data from a remote station 106 on an uplink 110.

The transmitted signal 232 is shown traveling over a wireless channel 234. When a signal 232' is received by an antenna 230', the received signal 232' may be downconverted to a baseband signal by an RF front end 228'. A guard removal component 226' may then remove the guard interval that was inserted between OFDM/OFDMA symbols by the transmitter 202.

The output of the guard removal component 226' may be provided to an S/P converter 224'. The S/P converter 224' may divide the OFDM/OFDMA symbol stream 222' into the N parallel time-domain sample streams 218'. A fast Fourier transform (FFT) component 220' converts the N parallel time-domain sample streams 218' into the frequency domain, and outputs N parallel frequency-domain (modulation) symbol streams 216'.

A demapper 212' performs the inverse of the symbol mapping operation that was performed by the mapper 212, thereby outputting N parallel data streams 210'. A P/S converter 208' combines the N parallel data streams 210' into a single data stream 206'. Ideally, this data stream 206' corresponds to the data 206 that was provided as input to the transmitter 202.

FIGS. 3A through 3D illustrate an example of a frame structure for an OFDM/OFDMA system 100. Referring initially to FIG. 3A, an OFDM/OFDMA frame 306 is shown with respect to a time axis 308. The OFDM/OFDMA frame 306 may be transmitted from a base station 104 to a remote station 106 on a downlink 108.

The OFDM/OFDMA frame 306 is shown with one preamble symbol 310 and multiple data symbols 312. Although just one preamble symbol 310 is shown in FIG. 3A, an OFDM/OFDMA frame 306 may include multiple preamble symbols 310.

FIGS. 3B and 3C illustrate examples of frequency domain representations of a preamble symbol 310. These frequency domain representations are shown with respect to a sub-carrier axis 316. A used sub-carrier region 318 is shown. Two guard regions 320 are also shown.

In FIG. 3B, the used sub-carrier region 318 includes pilot sub-carriers 314a alternated with unmodulated sub-carriers 314b. In FIG. 3C, each sub-carrier in the used sub-carrier region 318 is a pilot sub-carrier 314a.

FIG. 3D illustrates an example of a frequency domain representation of a data symbol 312. The data symbol 312 includes both data sub-carriers 314c and pilot sub-carriers 314a. A receiver 204 may perform channel estimation using pilot sub-carriers 314a of a preamble symbol 310 and/or pilot sub-carriers 314a of a data symbol 312.

Figure 4:
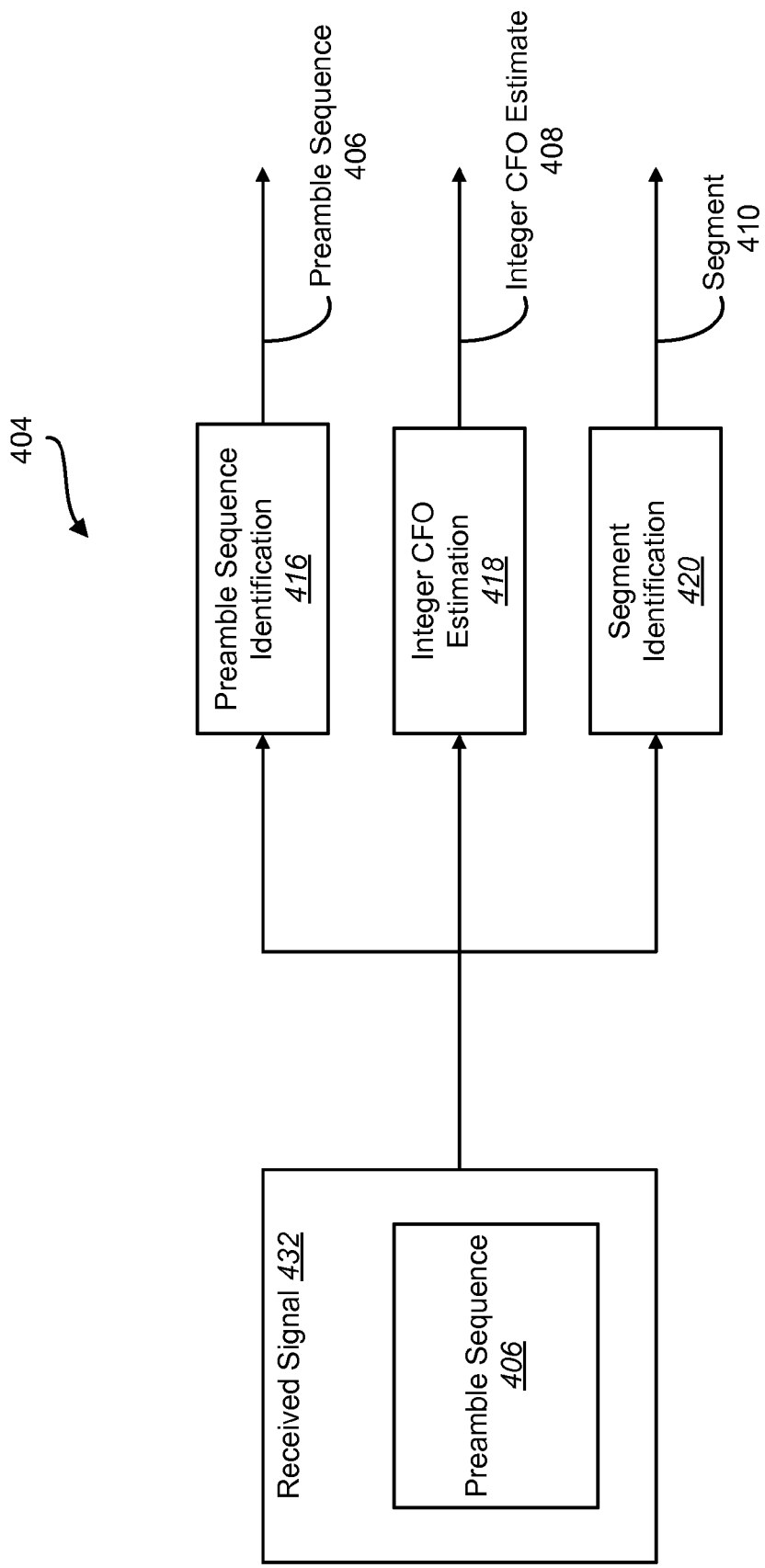
FIG. 4 illustrates an example of an OFDM/OFDMA receiver that is configured to identify a preamble sequence and to estimate an integer carrier frequency offset (CFO)

FIG. 4 illustrates an OFDM/OFDMA receiver 404 that is configured to identify a preamble sequence 406 and to estimate an integer carrier frequency offset (CFO) 408. The receiver 404 may be implemented in a remote station 106 in an OFDM/OFDMA system 100. In addition to the components that are shown in FIG. 4, the receiver 404 may also include the components that are shown in connection with the OFDM/OFDMA receiver 204 of FIG. 2.

The receiver 404 is shown receiving a signal 432 that was transmitted by an OFDM/OFDMA transmitter 202. The received signal 432 includes a preamble sequence 406. The received signal 432 is shown being processed by the OFDM/OFDMA receiver 404 for purposes of preamble sequence identification, integer carrier frequency offset (CFO) estimation, and segment identification. The receiver 404 is shown with a preamble sequence identification component 416, an integer CFO estimation component 418, and a segment identification component 420.

Multiple preamble sequences 406 may be defined for an OFDM/OFDMA system 100. Preamble sequence identification is the process of determining which preamble sequence 406, out of all possible preamble sequences 406, is included in the received signal 432.

Carrier frequency offset (CFO) refers to the difference in frequency between the sub-carriers of the receiver 404 and the sub-carriers of the transmitter 202. Integer CFO estimation is the process of estimating the integer CFO 408. Integer CFO estimation may be performed in order to improve the performance of the receiver 204.

Each preamble sequence 406 that is defined for an OFDM/OFDMA system 100 may be associated with a segment 410. Segment identification is the process of determining which segment 410 the preamble sequence 406 is associated with.

A segment 410 may correspond to a sector 112. For example in the case of a three sector-based network configuration, BS0 (sector 0) may use segment 0, BS1 (sector 1) may use segment 1 and BS2 (sector 2) may use segment 2.

Preamble sequence identification, integer CFO estimation, and segment identification may be performed in a "cold start" situation, i.e., a situation where a remote station 106 is powered on but the remote station 106 has not yet associated with a segment 410 of a base station 104. In order to associate with a segment 410 of a base station 104, a remote station 106 may attempt to detect a specific preamble sequence 406 in a signal 432 that is transmitted by the base station 104 and received by the remote station 106. Preamble sequence identification, integer CFO estimation, and segment identification may be performed concurrently.

FIGS. 5A and 5B illustrate examples of preamble sequences 506a, 506b that may be defined for an OFDM/OFDMA system 100. These preamble sequences 506a, 506b are defined in the standard specification for an IEEE.16e OFDM/OFDMA system 100. The preamble sequences 506a shown in FIG. 5A correspond to an OFDM/OFDMA system that uses 1024 sub-carriers. The preamble sequences 506b shown in FIG. 5B correspond to an OFDM/OFDMA system that uses 512 sub-carriers.

Each preamble sequence 506a, 506b is associated with a segment 510a, 510b. Each preamble sequence 506a, 506b is also associated with a cell 102, which is identified by a cell identifier (IDcell) 512a, 512b. Each preamble sequence 506a, 506b is also associated with an index 516a, 516b, which may be referred to as a preamble index 516a, 516b.

Different sets of sub-carriers 220 may be assigned to different segments 410. As used herein, the term $PA_{cset}$ may refer to the set of sub-carriers 220 that is assigned to segment s (where s=0, 1, or 2) for transmission of a signal 432 that includes a preamble sequence 406. $PA_{cset}$ may be given as:

$$PA_{cset} = s + 3z \quad (1)$$

The term z represents a running index starting from 0 to M−1, where M is the length of the preamble sequence 406. Thus, if the number of sub-carriers 220 is equal to 1024 (M=284), then the following sub-carriers 220 may be assigned to segment 0: 0, 3, 6, 9, . . . , 849. The following sub-carriers 220 may be assigned to segment 1: 1, 4, 7, 10, . . . , 850. The following sub-carriers 220 may be assigned to segment 2: 2, 5, 8, 11, . . . , 851. (In these numerical examples, the first sub-carrier in the used sub-carrier region 318 is designated sub-carrier 0.)

A frequency offset index (FOI) based format of $PA_{cset}$ may be defined as follows:

$$i_{s,m} = \text{convert\_to\_FOI\_index\_format}(PA_{cset}),$$
$$m=1,2,\ldots,M \quad (2)$$

The term $i_{s,m}$ is the $m^{th}$ sub-carrier index (FOI based) of the preamble that is associated with segment s. The resulting preamble after assigning sub-carriers as described above is shown in FIG. 5C. Assuming an N-point FFT (or IFFT), there are N sub-carriers from the first sub-carrier to the Nth sub-carrier. In FOI-based numbering, the first sub-carrier is associated with the lowest frequency, the Nth sub-carrier is associated with the highest frequency, and the DC sub-carrier is positioned in the center.

Figure 5C:
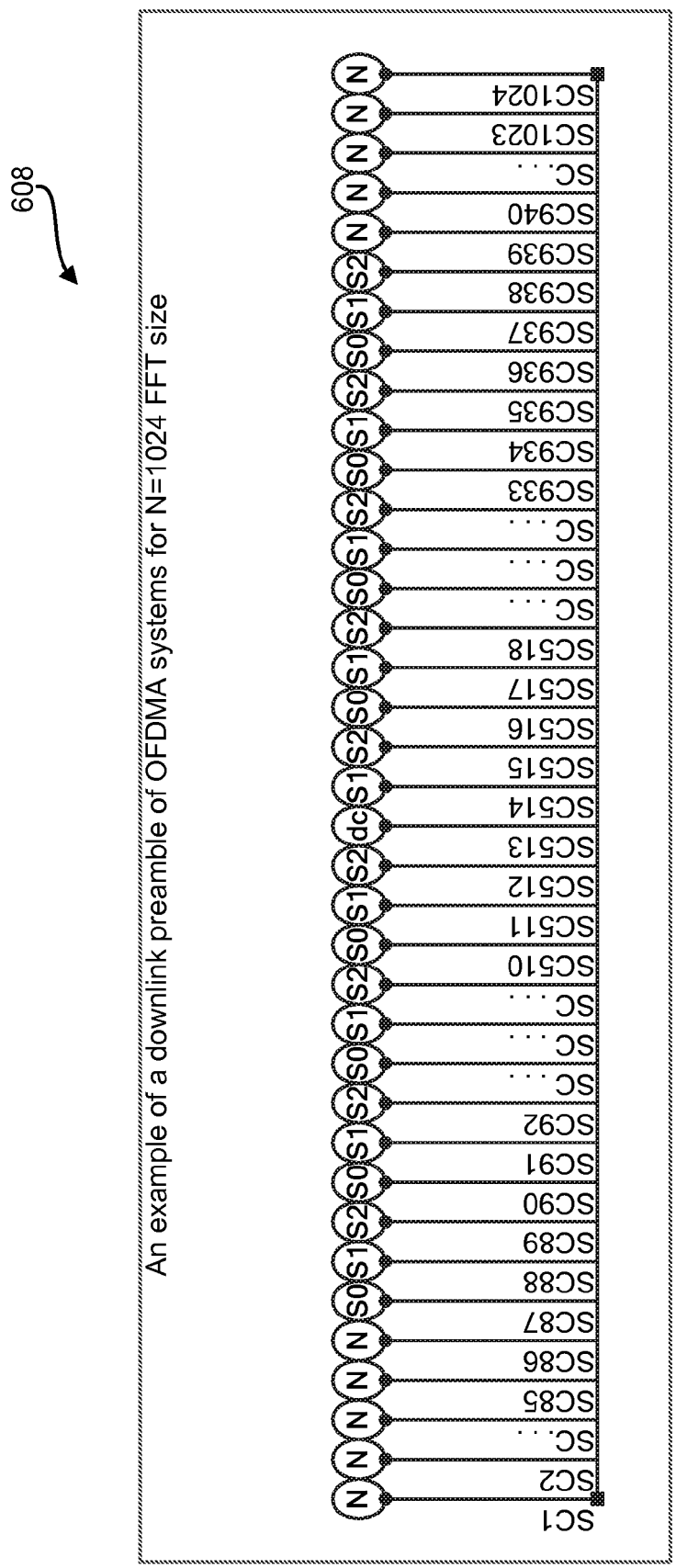
FIG. 5C shows a frequency domain representation of a downlink preamble for an IEEE802.16e OFDM/OFDMA system.

In the example of FIG. 5C, the sub-carriers are numbered SC(1) to SC(N). Alternatively, these sub-carriers may be numbered SC(0) to SC(N−1).

As used herein, the term $N_{pn}$ refers to the total number of preamble sequences 406 that are defined for a particular OFDM/OFDMA system 100. The term $N_{pnseg}$ refers to the total number of preamble sequences 406 that correspond to a specific segment 410. The term $N_{seg}$ refers to the number of segments 410. The standard specification for an IEEE802.16e OFDM/OFDMA system 100 defines the following values for OFDM/OFDMA systems 100 that use 1024 sub-carriers: $N_{pn}=114$, $N_{pnseg}=38$, and $N_{seg}=3$.

The set of preamble sequences 406 that are defined for a particular OFDM/OFDMA system 100 may be expressed as:

$$\text{set of preamble sequences} = [PA_1, PA_2, \ldots, PA_j, \ldots, PA_{N_{pn}}]$$

$PA_j$; $j^{th}$ preamble sequence $$j=1,2,\ldots,N_{pn}; \text{ index of preamble sequence} \quad (3)$$

Each preamble sequence $PA_j$ includes length M pseudo-noise (PN) codes. This is expressed in equation (4) below. As expressed in equation (5), each preamble sequence 406 has its own segment number's and sub-carrier set '$i_{s,m}$' depending on the segment number.

$$PA_j = [c_1, c_2, \ldots, c_m, \ldots, c_M]$$

$c_m$; $m^{th}$ code of preamble sequence (4)

$i_{s,m}$; FOI based index of segment(PA subcarrier set)s $$m=1,2,\ldots,M$$

$$s=0,1,2; \text{segment(PA subcarrier set)} \quad (5)$$

For purposes of the present discussion, let $X(k;j)$ be a frequency domain representation of a transmitted signal 232 that includes the $j^{th}$ preamble sequence 406 from the set of all possible preamble sequences 406. Let $x(n;j)$ be the corresponding time domain signal of $X(k;j)$. Let $y(n;j)$ be the received signal 432, in the time domain, corresponding to $x(n;j)$. Let $Y(k;j)$ be the corresponding frequency domain signal of $y(n;j)$. For purposes of the present discussion, it will be assumed that $X(k;j)$ and $Y(k;j)$ are ordered in FOI (frequency offset index).

$X(k;j)$=preamble signal in frequency domain,
$$k=1,2,\ldots,N \quad (6)$$

$$x(n;j) = ifft\{fftshif(X(k;j))\}, n=1,2,\ldots,N, k=1,2,\ldots,N \quad (7)$$

$y(n;j)$=received signal in time domain, $n=1,2,\ldots,N=$
$$x(n;j)*h(n)+\eta(n) \quad (8)$$

$$Y(k;j) = fftshift(fft(y(n;j))), n=1,2,\ldots,N, k=1,2,\ldots,N \quad (9)$$

In the case of the "cold start" situation described above, one approach for preamble sequence identification might be to search for the preamble sequences 406 for all possible integer CFO candidates. As indicated above, there may be a relatively large number of possible preamble sequences 406 (e.g., 114 possible preamble sequences in OFDM/OFDMA systems that utilize 1024 or 512 sub-carriers). For each preamble sequence 406, $2 \times Z_i$ integer CFO candidates are possible, where $Z_i$ is the maximum allowable integer CFO value. Thus, searching for the preamble sequences 406 for all possible integer CFO candidates may include a significant number of computations.

Both preamble sequence identification and integer CFO estimation may be done concurrently as the following cross correlation process:

$$C(z;j) = \sum_{m=1}^{m=M} X(i_{s,m};j) * Y(i_{s,m}+z;j) \quad (10)$$

$z = -Z_i : 1 : Z_i$; Possible Integer CFO range $j = 1, 2, \ldots, N_{pn}$; Possible preamble sequences $i_{s,m}$; PA sequence index of s $m = 1, 2, \ldots, M$ $s = 0, 1, 2$; segment In equation (10), the term $Z_i$ is the maximum allowable integer CFO value, the term M is the length of a preamble sequence 406, and the term $i_{s,m}$ is the $m^{th}$ sub-carrier index that is associated with segment s, in frequency offset index (FOI) format.

Using the above results, it may be possible to estimate the integer CFO 408 normalized by sub-carrier frequency spacing. It may also be possible to identify the preamble sequence 406 (or, more specifically, the preamble index 516a, 516b corresponding to the preamble sequence 406). This is shown in equations (11) through (14) below. Once the preamble sequence 406 is known, the segment 410 may also be extracted from the appropriate table of preamble sequences 406 (e.g., the tables shown in FIGS. 5A and 5B).

$$[z_c, j_c] = \underset{z,j}{\arg\max}\{|C(z;j)|\} \quad (11)$$

$$\Delta f_{int}^N = z_c \quad (12)$$

$$J_{PAindex} = j_c \quad (13)$$

$$s = \text{from } J_{PAindex} \quad (14)$$

Equation (10) for determining the cross-correlation may not work properly in some environments where there is an imperfect symbol timing or channel effects. To mitigate effects of the phase rotation caused by channel or symbol timing offset, a partial correlation scheme may be used as follows:

$$C(z;j) = \sum_{b=1}^{B} \left| \sum_{m=(b-1)N_b+1}^{min(bN_b,M)} X(i_{s,m};j) * Y(i_{s,m}+z;j) \right| \quad (15)$$

$z = -Z_i : 1 : Z_i$; Possible Integer CFO range $j = 1, 2, \ldots, N_{pn}$; Possible preamble sequences $i_{s,m}$; PA sequence index of $s$ $m = 1, 2, \ldots, M$ $s = 0, 1, 2$; segment $B = \text{ceil}\left(\frac{M}{N_b}\right)$ $N_b$: # samples of a partial correlation In equation (15), the term $N_b$ is the number of samples of partial correlation. The term M is the length of a preamble sequence 406. The term B is the number of partial correlation. The value of $N_b$ may fall within the range of 4 to 16 for partial correlation.

Figure 6:
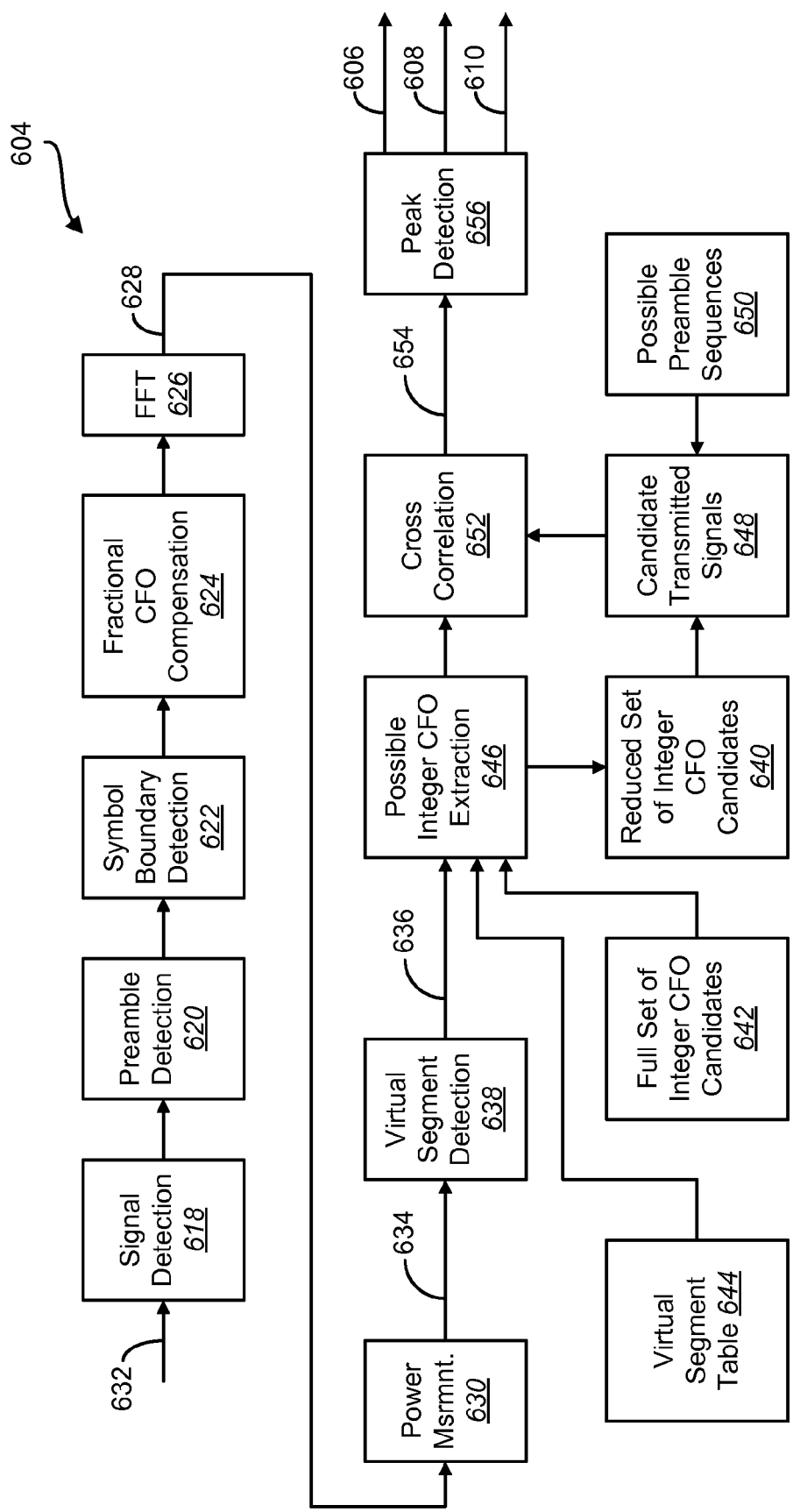
FIG. 6 illustrates another example of an OFDM/OFDMA receiver that is configured to identify a preamble sequence and to estimate an integer carrier frequency offset (CFO)

FIG. 6 illustrates another OFDM/OFDMA receiver 604 that is configured to identify a preamble sequence 606 and to estimate an integer carrier frequency offset (CFO) 608. The receiver 604 is an example of an implementation of the receiver 404 shown in FIG. 4. The receiver 604 may be implemented in a remote station 106 in an OFDM/OFDMA system 100.

The receiver 604 is shown receiving a signal 632 that was transmitted by an OFDM/OFDMA transmitter 202. In a cold start situation, the receiver 604 may initially perform signal detection and preamble detection with respect to the received signal 632. Signal detection involves determining whether there is an incoming signal 632 or not, and preamble detection involves determining whether the incoming signal 632 includes a preamble sequence 606 or not. The receiver 604 is shown with a signal detection component 618 and a preamble detection component 620.

After signal detection and preamble detection are performed, symbol boundary detection may be performed. Symbol boundary detection involves detecting the OFDM/OFDMA symbol boundary. The receiver 604 is shown with a symbol boundary detection component 622.

Once signal detection, preamble detection, and symbol boundary detection are performed, then fractional carrier frequency offset (CFO) compensation may be performed in the time domain. The receiver 604 is shown with a fractional CFO compensation component 624.

The output of the fractional CFO compensation component 624 may be converted from the time domain into the frequency domain. This may be performed by a fast Fourier transform (FFT) component 626. The output of the FFT component 626 may be referred to as a processed received signal 628.

As indicated above, the received signal 632 may include a preamble sequence 606. Transmission of the preamble sequence 606 may have been achieved by modulating the preamble sequence 606 onto multiple orthogonal sub-carriers. The power of the sub-carriers may be determined in accordance with equation (16) below.

$P(k) = |Y(k)|^2$, $k = K_{min} : 1 : K_{max}$ $K_{min} = \min(i_{s,m=1}) - Z_i$ $K_{max} = \max(i_{s,m=M}) + Z_i$ $z = -Z_i : 1 : Z_i$; possible int eger CFO range (16)

The receiver 604 is shown with a power measurement component 630 that receives the processed received signal 628 as input, and that outputs power values 634 corresponding to the sub-carriers. The processed received signal 628 may correspond to Y(k) in equation (16). The power values 634 may correspond to P(k) in equation (16).

Various alternatives to equation (16) are possible. For example, to reduce complexity, only some of the samples may be used instead of all possible samples. As another example, instead of determining the power of the sub-carriers, the absolute value of the processed received signal 628 may be determined.

A virtual segment 636 may be determined based on the power values 634 of the sub-carriers. The virtual segment 636 indicates the offset position of the most active sub-carriers starting from $K_{min}$ (as $K_{min}$ is defined in equation (16) above). The virtual segment 636 may be determined in accordance with equations (17) and (18).

$P(v) = \text{sum}(P(K_{min}+v:3:K_{max}))$ $v = 0,1,2$; virtual segment (17)

$v_s = \arg\max(P(v))$; decided virtual segment $$v_s = \underset{v}{\operatorname{argmax}}(P(v)); \text{ decided virtual segment} \quad (18)$$

$v = 0, 1, 2$; virtual segment

The receiver 604 is shown with a virtual segment detection component 638 that receives the power values 634 as input, and that outputs the virtual segment 636. The virtual segment 636 may correspond to $v_s$ in equation (18).

Figure 9:
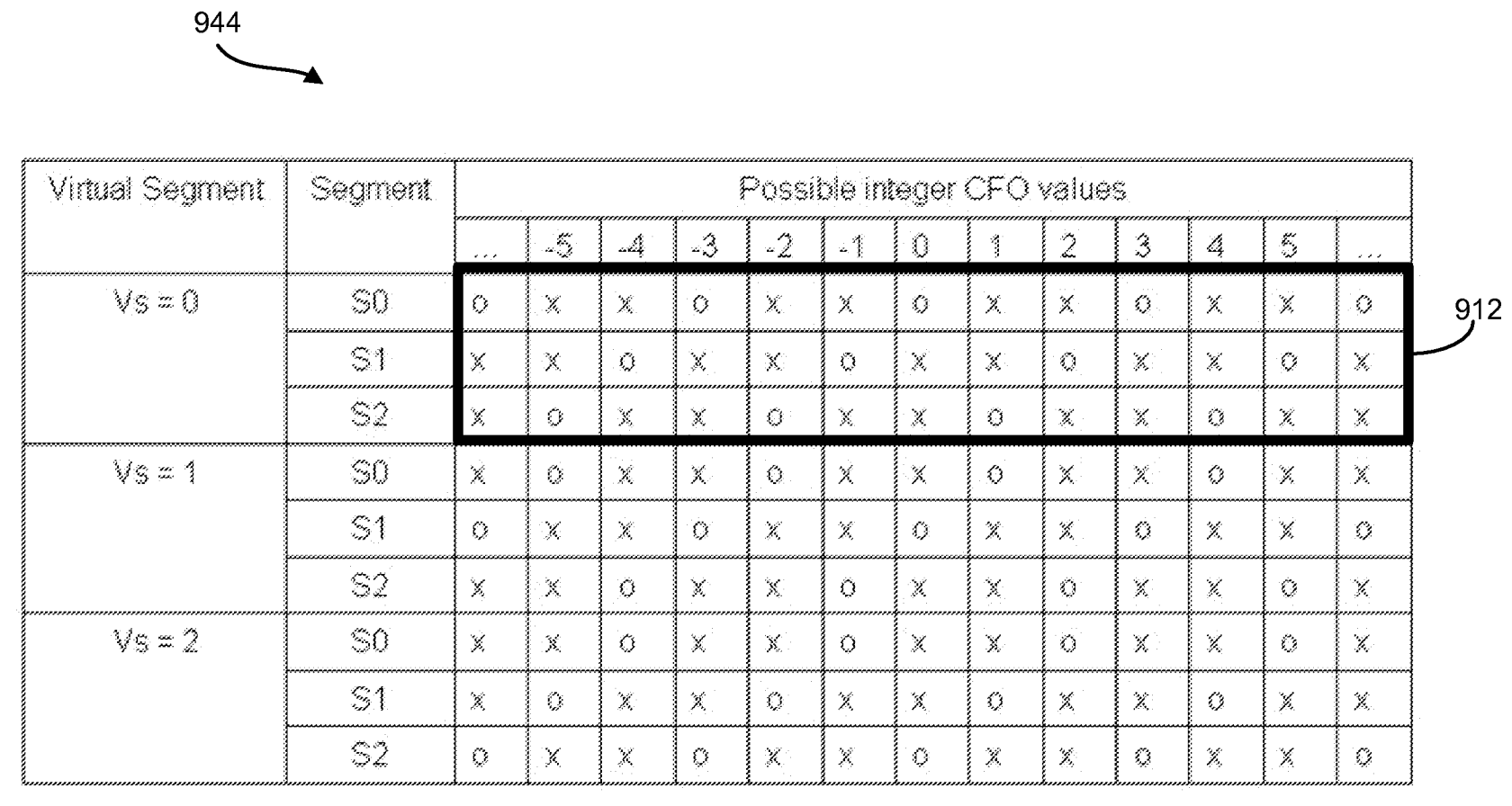

A reduced set of integer CFO candidates 640 (i.e., a set of integer CFO candidates that is smaller than a full set of integer CFO candidates 642) may be determined. The reduced set of integer CFO candidates 640 may be determined based on the virtual segment 636 that is determined. A virtual segment table 644 may also be used to determine the reduced set of integer CFO candidates 640. An example of a virtual segment table 644 is shown in FIG. 9 and will be discussed below.

The receiver 604 is shown with a possible integer CFO extraction component 646. The possible integer CFO extraction component 646 may be configured to determine the reduced set of integer CFO candidates 640 based on the virtual segment 636 that is determined, and also based on the virtual segment table 644.

Cross-correlation operations may be performed with respect to the received signal 632 and multiple candidate transmitted signals 648. Each candidate transmitted signal 648 may include a particular preamble sequence 606 selected from the set of all possible preamble sequences 650. Additionally, each candidate transmitted signal 648 may correspond to a possible integer CFO candidate selected from the reduced set of integer CFO candidates 640.

The cross-correlation operations may be performed in accordance with equation (19).

$$C(z;j) = \sum_{b=1}^{B} \left| \sum_{m=(b-1)N_b+1}^{min(bN_b,M)} X(i_{s,m};j) * Y(i_{s,m}+z;j) \right| \quad (19)$$

-continued $z = -Z_i + v_s - s : 3 : Z_i$; Possible Integer CFO range $v_s = 0$ or 1 or 2; decided virtual segment $j = 1, 2, \ldots, N_{pn}$; Possible preamble sequences $i_{s,m}$; PA sequence index of $s$ $m = 1, 2, \ldots, M$ $s = 0, 1, 2$; segment $B = \text{ceil}\left(\dfrac{M}{N_b}\right)$ $N_b$: # samples of a partial correlation In equation (19), the term $v_s$ refers to the virtual segment 636. The possible integer CFO range (i.e., $-Z_i+v_s-s:3:Z_i$) corresponds to the reduced set of integer CFO candidates 640. The term X( ) corresponds to a candidate transmitted signal 648. The term Y( ) corresponds to the processed received signal 628.

The receiver 604 is shown with a cross-correlation component 652 that receives the processed received signal 628 and candidate transmitted signals 648 as input, and that outputs correlation values 654. The correlation values 654 may correspond to C(z;j) in equation (19).

The correlation values 654 may be used to identify the preamble sequence 606 within the received signal 632 and to estimate the integer CFO 608 of the received signal 632. Once the preamble sequence 606 is identified, the segment 610 that corresponds to the preamble sequence 606 may also be identified. Preamble sequence identification, integer CFO estimation, and segment identification may be done in accordance with equations (11) through (14) above.

The receiver 604 is shown with a peak detection component 656. The peak detection component 656 is shown receiving the correlation values 654 as input, and outputting a preamble sequence 606, an estimated integer CFO 608, and a segment 610 corresponding to the identified preamble sequence 606. The preamble sequence 606 may be identified by the appropriate preamble index 516a, 516b.

In equation (19) above, correlation is performed in the frequency domain. However, another correlation scheme may be used for the reduced candidates. For example, a time domain peak detection scheme may be used.

Figure 7:
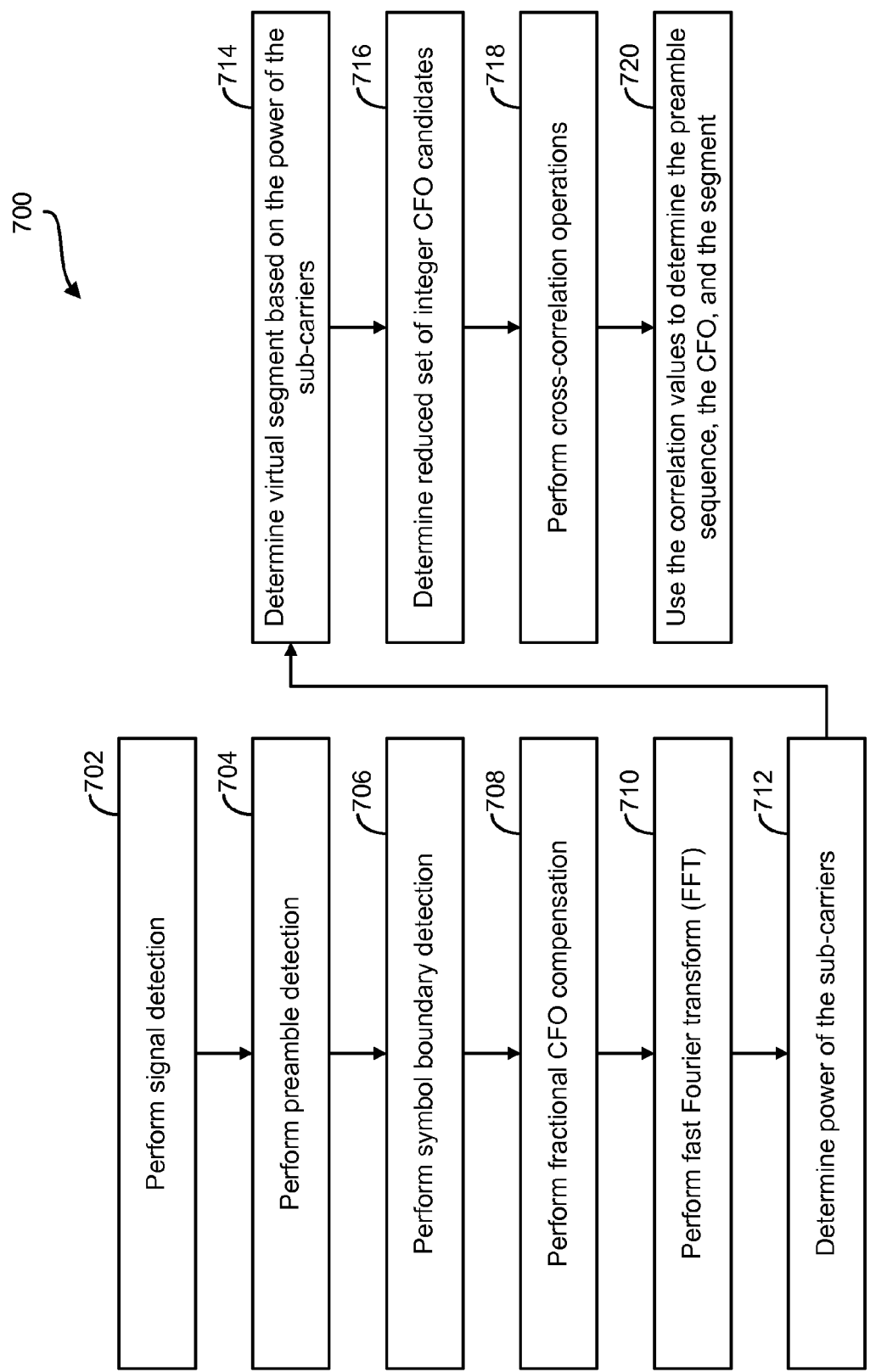
FIG. 7 illustrates a method for identifying a preamble sequence and for estimating an integer CFO.

FIG. 7 illustrates a method 700 for identifying a preamble sequence 606 and for estimating an integer carrier frequency offset (CFO) 608. The method 700 may be performed by a receiver 604, which may be implemented in a remote station 106 in an OFDM/OFDMA system 100.

In response to a signal 632 being received, signal detection may be performed 702 on the received signal 632. Preamble detection may also be performed 704 on the received signal 632. Symbol boundary detection may also be performed 706 on the received signal 632. Fractional CFO compensation may also be performed 708 on the received signal 632. A fast Fourier transform (FFT) operation may also be performed 710 on the received signal 632. At this stage, the received signal 632 may be referred to as a processed received signal 628.

As indicated above, the received signal 632 may include a preamble sequence 606. Transmission of the preamble sequence 606 may have been achieved by modulating the preamble sequence 606 onto multiple orthogonal sub-carriers. The method 700 may include determining 712 the power of the sub-carriers. This may be accomplished in accordance with equation (16) above.

A virtual segment 636 may then be determined 714 based on the power of the sub-carriers. This may be done in accordance with equations (17) and (18) above. A reduced set of integer CFO candidates 640 may then be determined 716 based on the virtual segment 636.

Cross-correlation operations may be performed 718 with respect to the received signal 632 and multiple candidate transmitted signals 648. Each candidate transmitted signal 648 may include a particular preamble sequence 606 selected from the set of all possible preamble sequences 650. Additionally, each candidate transmitted signal 648 may correspond to a possible integer CFO candidate selected from the reduced set of integer CFO candidates 640. The cross-correlation operations may be performed in accordance with equation (19) above.

The correlation values 654 that are obtained as a result of performing the cross-correlation operations may be used to identify the preamble sequence 606 (e.g., by identifying a preamble index 516a, 516b corresponding to the preamble sequence 606) and to estimate the integer CFO 608 of the received signal 632. Once the preamble sequence 606 is identified, the segment 610 that corresponds to the preamble sequence 606 may also be identified. Identifying the preamble sequence 606, estimating the integer CFO 608, and identifying the segment 610 that corresponds to the preamble sequence 606 may be performed concurrently.

Figure 8:
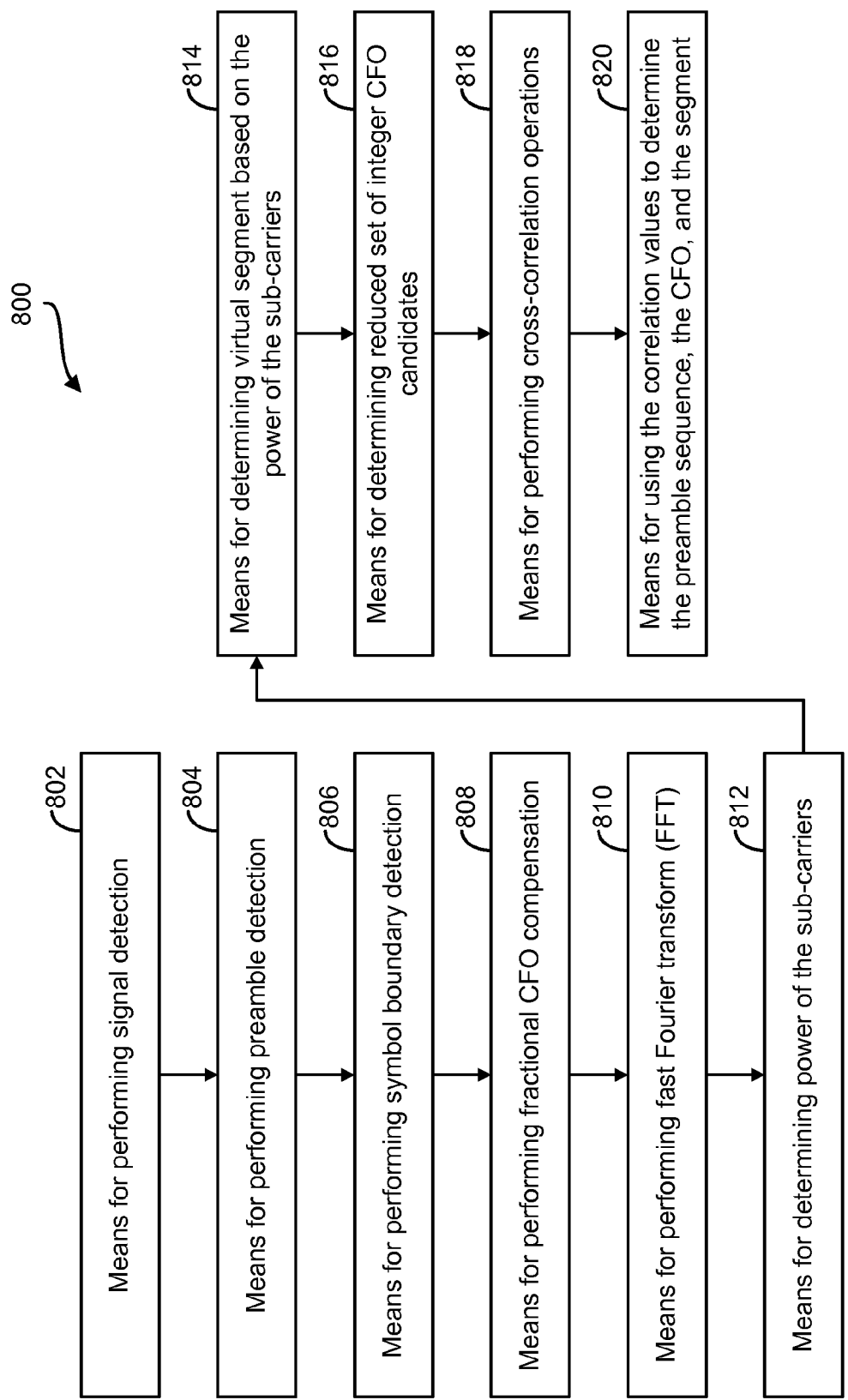
FIG. 8 illustrates means-plus-function blocks corresponding to the method shown in FIG. 7.

The method 700 of FIG. 7 described above may be performed by various hardware and/or software component(s) and/or module(s) corresponding to the means-plus-function blocks 800 illustrated in FIG. 8. In other words, blocks 702 through 720 illustrated in FIG. 7 correspond to means-plus-function blocks 802 through 820 illustrated in FIG. 8.

FIG. 9 illustrates an example of a virtual segment table 944. As indicated above, the virtual segment table 944 may be used to determine a reduced set of integer CFO candidates 640. The virtual segment table 944 indicates relationships between virtual segments 636 and reduced sets of integer CFO candidates 640. For example, the reduced set of integer CFO candidates 640 that corresponds to virtual segment zero are marked by an "O" within the highlighted portion 912 of the table. Although the virtual segment table 944 is shown in the form of a table, there are many other kinds of data structures that may be used to represent the information contained therein.

As indicated above in equation (19), the reduced set of integer CFO candidates for a given segment s is given by $z=-Z_i+v_s-s:3:Z_i$. As shown in FIG. 9, the reduced sets of integer CFO candidates for different segments may be as follows:

$v_s=0$ and $s=0$; $z= \ldots -3\ 0\ 3\ 6 \ldots$ $v_s=0$ and $s=1$; $z= \ldots -4\ -1\ 2\ 5 \ldots$ $v_s=0$ and $s=2$; $z= \ldots -5\ -2\ 1\ 4 \ldots$ Once the virtual segment is chosen, the possible integer CFOs are limited for each segment as shown in the table of FIG. 9 ("O" indicates a possible candidate, while "x" indicates an impossible candidate). The actual segment is not known at this time, but all possible preamble sequences that are defined (see, e.g., FIG. 5A or 5B as appropriate) will be searched with the corresponding segment number. For example, assuming the virtual segment=0, a search may proceed as follows for preamble index 0 that corresponds to segment 0 from the table in FIG. 9:

Reference preamble sequence of index 0: $X(i_{s,m};j)$, $i_{s,m}=87, 90, \ldots$ (see FIG. 5C), j=0 (index 0)

Received preamble: $Y(i_{s,m}+z;j)$, $z= \ldots -3, 0, 3, \ldots$

Correlation for $z=-3$; $X^*(87) \times Y(84) + X^*(90) \times Y(87) + \ldots$

Correlation for z=0; X*(87)×Y(87)+X*(90)×Y(90)+ . . . .
Correlation for z=3; X*(87)×Y(90)+X*(90)×Y(93)+ . . . .

In this example, z= . . . −2, −1, 1, 2, . . . were not considered because in this example those positions are not allowed as a possible integer CFO if the virtual segment is "0" and the actual segment is "0" based on the table in FIG. 9 and the preamble sequence definitions in FIGS. 5A and 5B.

The partial cross-correlation scheme represented by equation (19) is used in this example. However, as mentioned above, other correlation schemes may be used.

Figure 10:
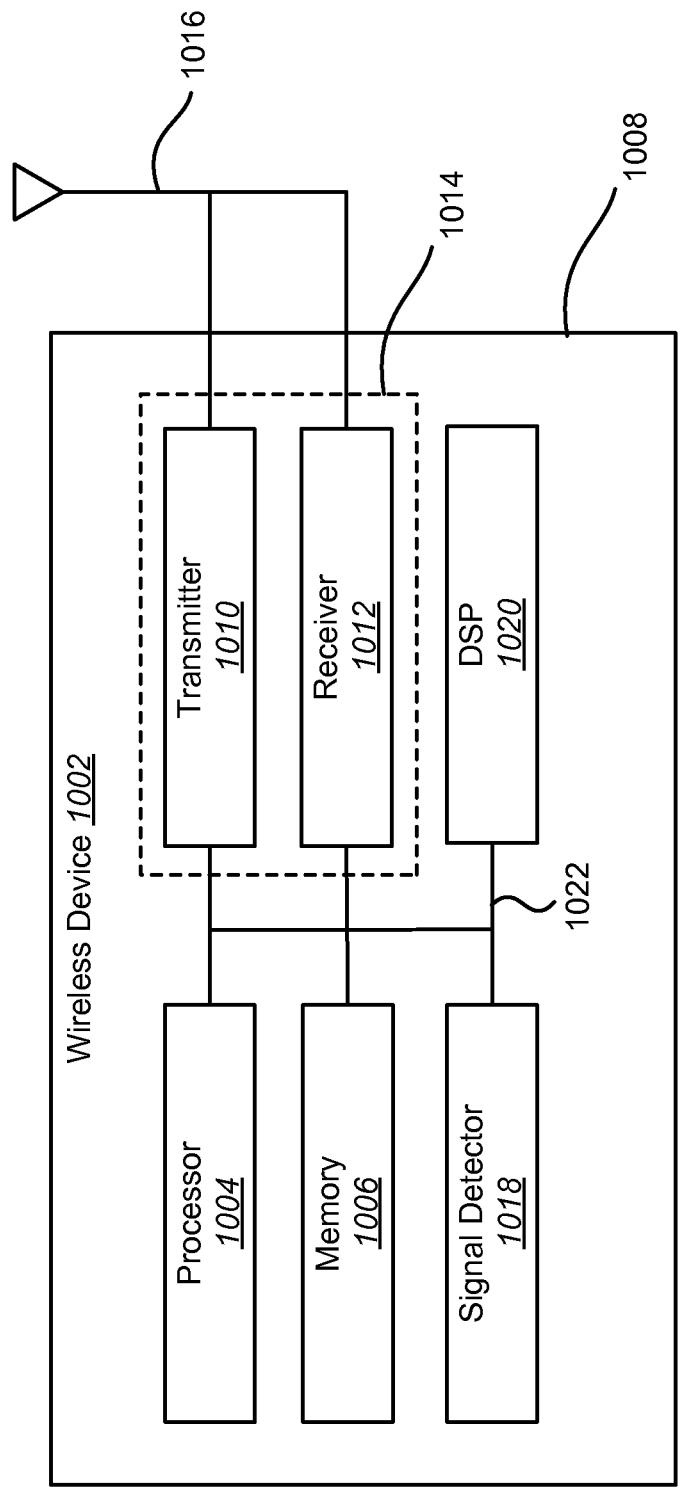
FIG. 10 illustrates various components that may be utilized in a wireless device.

FIG. 10 illustrates various components that may be utilized in a wireless device 1002. The wireless device 1002 is an example of a device that may be configured to implement the various methods described herein. The wireless device 1002 may be a base station 104 or a remote station 106.

The wireless device 1002 may include a processor 1004 which controls operation of the wireless device 1002. The processor 1004 may also be referred to as a central processing unit (CPU). Memory 1006, which may include both read-only memory (ROM) and random access memory (RAM), provides instructions and data to the processor 1004. A portion of the memory 1006 may also include non-volatile random access memory (NVRAM). The processor 1004 typically performs logical and arithmetic operations based on program instructions stored within the memory 1006. The instructions in the memory 1006 may be executable to implement the methods described herein.

The wireless device 1002 may also include a housing 1008 that may include a transmitter 1010 and a receiver 1012 to allow transmission and reception of data between the wireless device 1002 and a remote location. The transmitter 1010 and receiver 1012 may be combined into a transceiver 1014. An antenna 1016 may be attached to the housing 1008 and electrically coupled to the transceiver 1014. The wireless device 1002 may also include (not shown) multiple transmitters, multiple receivers, multiple transceivers and/or multiple antenna.

The wireless device 1002 may also include a signal detector 1018 that may be used to detect and quantify the level of signals received by the transceiver 1014. The signal detector 1018 may detect such signals as total energy, pilot energy per pseudonoise (PN) chips, power spectral density, and other signals. The wireless device 1002 may also include a digital signal processor (DSP) 1020 for use in processing signals.

The various components of the wireless device 1002 may be coupled together by a bus system 1022 which may include a power bus, a control signal bus, and a status signal bus in addition to a data bus. However, for the sake of clarity, the various busses are illustrated in FIG. 10 as the bus system 1022.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for identifying a preamble sequence and for estimating an integer carrier frequency offset, comprising:
   determining a reduced set of integer carrier frequency offset (CFO) candidates corresponding to a received signal that comprises a preamble sequence from a set of possible preamble sequences;
   performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
   using the correlation values to identify the preamble sequence and to estimate the integer CFO, in which a full set of integer CFO candidates comprises $2 \times Z_i$ integer CFO candidates for each of the possible preamble sequences, and $Z_i$ is the maximum allowable integer CFO.

2. The method of claim 1, wherein identifying the preamble sequence and estimating the integer CFO are performed concurrently.

3. The method of claim 1, wherein identifying the preamble sequence comprises identifying a preamble index that is associated with the preamble sequence.

4. The method of claim 1, further comprising identifying a segment corresponding to the preamble sequence.

5. The method of claim 1, further comprising determining a virtual segment, wherein the reduced set of integer CFO candidates is determined based on the virtual segment.

6. A method for identifying a preamble sequence and for estimating an integer carrier frequency offset, comprising:
   determining a reduced set of integer carrier frequency offset (CFO) candidates corresponding to a received signal that comprises a preamble sequence from a set of possible preamble sequences;
   performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
   using the correlation values to identify the preamble sequence and to estimate the integer CFO, wherein for a given segment s, the reduced set of integer CFO candidates is $z=-Z_i+v_s-s:3: Z_i$ wherein $Z_i$ is the maximum allowable integer CFO, and wherein $v_s$ is a virtual segment.

7. The method of claim 1, wherein transmission of the preamble sequence comprises modulating the preamble sequence onto multiple orthogonal sub-carriers, and further comprising:
   determining power of the sub-carriers; and
   determining a virtual segment based on the power of the sub-carriers.

8. A method for identifying a preamble sequence and for estimating an integer carrier frequency offset, comprising:
   determining a reduced set of integer carrier frequency offset (CFO) candidates corresponding to a received signal that comprises a preamble sequence from a set of possible preamble sequences;
   performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
   using the correlation values to identify the preamble sequence and to estimate the integer CFO, wherein the correlation operations are cross-correlation operations, wherein the cross-correlation operations are performed as $$C(z; j) = \sum_{b=1}^{B} \left| \sum_{m=(b-1)N_b+1}^{min(bN_b,M)} X(i_{s,m}; j) * Y(i_{s,m}+z; j) \right|,$$

wherein z is an index for the reduced set of integer CFO candidates, wherein j is an index for the possible preamble sequences, wherein X( ) is the transmitted signal, wherein Y( ) is the received signal, wherein M is the length of the preamble sequence, wherein $i_{s,m}$ is a set of sub-carriers assigned to segment s, wherein $N_b$ is the number of samples of a partial correlation, and wherein $$B = \text{ceil}\left(\frac{M}{N_b}\right).$$

9. The method of claim 1, wherein the method is performed by a remote station in a wireless communication system that is configured for orthogonal frequency division multiplexing.

10. A method for identifying a preamble sequence and for estimating an integer carrier frequency offset, comprising:
   determining a reduced set of integer carrier frequency offset (CFO) candidates corresponding to a received signal that comprises a preamble sequence from a set of possible preamble sequences;
   performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, wherein correlation values are determined as a result of the correlation operations, and wherein transmission of the preamble sequence comprises modulating the preamble sequence onto multiple orthogonal sub-carriers;
   using the correlation values to identify the preamble sequence and to estimate the integer CFO;
   determining power of the sub-carriers; and
   determining a virtual segment based on the power of the sub-carriers;

wherein the virtual segment is determined as $$v_s = \underset{v}{\mathrm{argmax}}(P(v)),$$

wherein $P(v)=\mathrm{sum}(P(K_{min}+v:3:K_{max}))$, wherein $K_{min}=\min(i_{s,m=1})-Z_i$, wherein $K_{max}=\max(i_{s,m=M})+Z_i$, wherein $Z_i$ is the maximum allowable integer CFO, wherein M is the length of the preamble sequence, and wherein $i_{s,m}$ is a set of sub-carriers assigned to segment s.

11. A wireless device that is configured to identify a preamble sequence and to estimate an integer carrier frequency offset, comprising:
 a processor;
 memory in electronic communication with the processor;
 instructions stored in the memory, the instructions being executable to:
  determine a reduced set of integer carrier frequency offset (CFO) candidates corresponding to a received signal that comprises a preamble sequence from a set of possible preamble sequences;
  perform correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
  use the correlation values to identify the preamble sequence and to estimate the integer CFO, in which for a given segment s, the reduced set of integer CFO candidates is $z=-Z_i+v_s-s:3:Z_i$, wherein $Z_i$ is the maximum allowable integer CFO, and wherein $v_s$ is a virtual segment.

12. The wireless device of claim 11, wherein identifying the preamble sequence and estimating the integer CFO are performed concurrently.

13. The wireless device of claim 11, wherein identifying the preamble sequence comprises identifying a preamble index that is associated with the preamble sequence.

14. The wireless device of claim 11, wherein the instructions are also executable to identify a segment corresponding to the preamble sequence.

15. The wireless device of claim 11, wherein the instructions are also executable to determine a virtual segment, wherein the reduced set of integer CFO candidates is determined based on the virtual segment.

16. The wireless device of claim 12 A wireless device that is configured to identify a preamble sequence and to estimate an integer carrier frequency offset, comprising:
 a processor;
 memory in electronic communication with the processor;
 instructions stored in the memory, the instructions being executable to:
  determine a reduced set of integer carrier frequency offset (CFO) candidates corresponding to a received signal that comprises a preamble sequence from a set of possible preamble sequences;
  perform correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
  use the correlation values to identify the preamble sequence and to estimate the integer CFO, wherein a full set of integer CFO candidates comprises $2 \times Z_i$ integer CFO candidates for each of the possible preamble sequences, and wherein $Z_i$ is the maximum allowable integer CFO.

17. The wireless device of claim 11, wherein transmission of the preamble sequence comprises modulating the preamble sequence onto multiple orthogonal sub-carriers, and wherein the instructions are also executable to:
 determine power of the sub-carriers; and
 determine the virtual segment based on the power of the sub-carriers.

18. A wireless device that is configured to identify a preamble sequence and to estimate an integer carrier frequency offset, comprising:
 a processor;
 memory in electronic communication with the processor;
 instructions stored in the memory, the instructions being executable to:
  determine a reduced set of integer carrier frequency offset (CFO) candidates corresponding to a received signal that comprises a preamble sequence from a set of possible preamble sequences;
  perform correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, wherein correlation values are determined as a result of the correlation operations, and wherein transmission of the preamble sequence comprises modulating the preamble sequence onto multiple orthogonal sub-carriers;
  use the correlation values to identify the preamble sequence and to estimate the integer CFO;
  determine power of the sub-carriers; and
  determine a virtual segment based on the power of the sub-carriers,
 wherein the virtual segment is determined as $$v_s = \underset{v}{\mathrm{argmax}}(P(v)),$$

wherein $P(v)=\mathrm{sum}(P(K_{min}+v:3:K_{max}))$, wherein $K_{min}=\min(i_{s,m=1})-Z_i$, wherein $K_{max}=\max(i_{s,m=M})+Z_i$, wherein $Z_i$ is the maximum allowable integer CFO, wherein M is the length of the preamble sequence, and wherein $i_{s,m}$ is a set of sub-carriers assigned to segment s.

19. A wireless device that is configured to identify a preamble sequence and to estimate an integer carrier frequency offset, comprising:
 a processor;
 memory in electronic communication with the processor;
 instructions stored in the memory, the instructions being executable to:
  determine a reduced set of integer carrier frequency offset (CFO) candidates corresponding to a received signal that comprises a preamble sequence from a set of possible preamble sequences;
  perform correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and use the correlation values to identify the preamble sequence and to estimate the integer CFO, wherein the correlation operations are cross-correlation operations, and wherein the cross-correlation operations are performed as $$C(z; j) = \sum_{b=1}^{B} \left| \sum_{m=(b-1)N_b+1}^{min(bN_b,M)} X(i_{s,m}; j) * Y(i_{s,m} + z; j) \right|,$$

wherein z is an index for the reduced set of integer CFO candidates, wherein j is an index for the possible preamble sequences, wherein X( ) is the transmitted signal, wherein Y( ) is the received signal, wherein M is the length of the preamble sequence, wherein $i_{s,m}$ is a set of sub-carriers assigned to segment s, wherein $N_b$ is the number of samples of a partial correlation, and wherein $$B = \text{ceil}\left(\frac{M}{N_b}\right).$$

20. The wireless device of claim 11, wherein the wireless device is a remote station in a wireless communication system that is configured for orthogonal frequency division multiplexing.

21. An apparatus that is configured to identify a preamble sequence and to estimate an integer carrier frequency offset, comprising:
means for determining a reduced set of integer carrier frequency offset (CFO) candidates corresponding to a received signal that comprises a preamble sequence from a set of possible preamble sequences;
means for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
means for using the correlation values to identify the preamble sequence and to estimate the integer CFO, in which a full set of integer CFO candidates comprises $2 \times Z_i$ integer CFO candidates for each of the possible preamble sequences, and wherein $Z_i$ is the maximum allowable integer CFO.

22. The apparatus of claim 21, wherein identifying the preamble sequence and estimating the integer CFO are performed concurrently.

23. The apparatus of claim 21, wherein identifying the preamble sequence comprises identifying a preamble index that is associated with the preamble sequence.

24. The apparatus of claim 21, further comprising means for identifying a segment corresponding to the preamble sequence.

25. The apparatus of claim 21, further comprising means for determining a virtual segment, wherein the reduced set of integer CFO candidates is determined based on the virtual segment.

26. An apparatus that is configured to identify a preamble sequence and to estimate an integer carrier frequency offset, comprising:
means for determining a reduced set of integer carrier frequency offset (CFO) candidates corresponding to a received signal that comprises a preamble sequence from a set of possible preamble sequences;
means for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
means for using the correlation values to identify the preamble sequence and to estimate the integer CFO, wherein for a given segment s, the reduced set of integer CFO candidates is $z=-Z_i+v_s-s:3$: $Z_i$, wherein $Z_i$ is the maximum allowable integer CFO, and wherein $v_s$ is a virtual segment.

27. The apparatus of claim 21, wherein transmission of the preamble sequence comprises modulating the preamble sequence onto multiple orthogonal sub-carriers, and further comprising:
means for determining power of the sub-carriers; and
means for determining a virtual segment based on the power of the sub-carriers.

28. An apparatus that is configured to identify a preamble sequence and to estimate an integer carrier frequency offset, comprising:
means for determining a reduced set of integer carrier frequency offset (CFO) candidates corresponding to a received signal that comprises a preamble sequence from a set of possible preamble sequences;
means for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, wherein correlation values are determined as a result of the correlation operations, and wherein transmission of the preamble sequence comprises modulating the preamble sequence onto multiple orthogonal sub-carriers;
means for using the correlation values to identify the preamble sequence and to estimate the integer CFO;
means for determining power of the sub-carriers; and
means for determining a virtual segment based on the power of the sub-carriers, wherein the virtual segment is determined as $$v_s = \underset{v}{\text{argmax}}(P(v)),$$

wherein $P(v)=\text{sum}(P(K_{min}+v:3:K_{max}))$, wherein $K_{min}=\min(i_{s,m=1})-Z_i$, wherein $K_{max}=\max(i_{s,m=M})+Z_i$, wherein $Z_i$ is the maximum allowable integer CFO, wherein M is the length of the preamble sequence, and wherein $i_{s,m}$ is a set of sub-carriers assigned to segment s.

29. An apparatus that is configured to identify a preamble sequence and to estimate an integer carrier frequency offset, comprising:
means for determining a reduced set of integer carrier frequency offset (CFO) candidates corresponding to a received signal that comprises a preamble sequence from a set of possible preamble sequences;

means for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and means for using the correlation values to identify the preamble sequence and to estimate the integer CFO, wherein the correlation operations are cross-correlation operations, and wherein the cross-correlation operations are performed as $$C(z; j) = \sum_{b=1}^{B} \left| \sum_{m=(b-1)N_b+1}^{min(bN_b,M)} X(i_{s,m}; j) * Y(i_{s,m} + z; j) \right|,$$

wherein z is an index for the reduced set of integer CFO candidates, wherein j is an index for the possible preamble sequences, wherein X( ) is the transmitted signal, wherein Y( ) is the received signal, wherein M is the length of the preamble sequence, wherein $i_{s,m}$ is a set of sub-carriers assigned to segment s, wherein $N_b$ is the number of samples of a partial correlation, and wherein $$B = \text{ceil}\left(\frac{M}{N_b}\right).$$

30. The apparatus of claim 21, wherein the apparatus is a remote station in a wireless communication system that is configured for orthogonal frequency division multiplexing.

31. A computer-program product for identifying a preamble sequence and for estimating an integer carrier frequency offset, the computer-program product comprising a non-transitory computer readable medium having instructions thereon, the instructions comprising:

code for determining a reduced set of integer carrier frequency offset (CFO) candidates corresponding to a received signal that comprises a preamble sequence from a set of possible preamble sequences;

code for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and code for using the correlation values to identify the preamble sequence and to estimate the integer CFO, in which a full set of integer CFO candidates comprises $2 \times Z_i$ integer CFO candidates for each of the possible preamble sequences, and wherein $Z_i$ is the maximum allowable integer CFO.

32. The computer-program product of claim 31, wherein identifying the preamble sequence and estimating the integer CFO are performed concurrently.

33. The computer-program product of claim 31, wherein identifying the preamble sequence comprises identifying a preamble index that is associated with the preamble sequence.

34. The computer-program product of claim 31, further comprising code for identifying a segment corresponding to the preamble sequence.

35. The computer-program product of claim 31, further comprising code for determining a virtual segment, wherein the reduced set of integer CFO candidates is determined based on the virtual segment.

36. A computer-program product for identifying a preamble sequence and for estimating an integer carrier frequency offset, the computer-program product comprising a non-transitory computer readable medium having instructions thereon, the instructions comprising:

code for determining a reduced set of integer carrier frequency offset (CFO) candidates corresponding to a received signal that comprises a preamble sequence from a set of possible preamble sequences;

code for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and code for using the correlation values to identify the preamble sequence and to estimate the integer CFO, wherein for a given segment s, the reduced set of integer CFO candidates is $z=-Z_i+v_s-s:3: Z_i$, wherein $Z_i$ is the maximum allowable integer CFO, and wherein $v_s$ is a virtual segment.

37. The computer-program product of claim 31, wherein transmission of the preamble sequence comprises modulating the preamble sequence onto multiple orthogonal sub-carriers, and further comprising:

code for determining power of the sub-carriers; and code for determining a virtual segment based on the power of the sub-carriers.

38. A computer-program product for identifying a preamble sequence and for estimating an integer carrier frequency offset, the computer-program product comprising a non-transitory computer readable medium having instructions thereon, the instructions comprising:

code for determining a reduced set of integer carrier frequency offset (CFO) candidates corresponding to a received signal that comprises a preamble sequence from a set of possible preamble sequences;

code for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, wherein correlation values are determined as a result of the correlation operations, and wherein transmission of the preamble sequence comprises modulating the preamble sequence onto multiple orthogonal sub-carriers;

code for using the correlation values to identify the preamble sequence and to estimate the integer CFO;

code for determining power of the sub-carriers; and code for determining a virtual segment based on the power of the sub-carriers, wherein the virtual segment is determined as $$v_s = \underset{v}{\operatorname{argmax}}(P(v)),$$

wherein $P(v)=\operatorname{sum}(P(K_{min}+v:3:K_{max}))$, wherein $K_{min}=\min(i_{s,m=1})-Z_i$, wherein $K_{max}=\max(i_{s,m=M})+Z_i$, wherein is the maximum allowable integer CFO, wherein M is the length of the preamble sequence, and wherein $i_{s,m}$ is a set of sub-carriers assigned to segment s.

39. A computer-program product for identifying a preamble sequence and for estimating an integer carrier frequency offset, the computer-program product comprising a non-transitory computer readable medium having instructions thereon, the instructions comprising:
    code for determining a reduced set of integer carrier frequency offset (CFO) candidates corresponding to a received signal that comprises a preamble sequence from a set of possible preamble sequences;
    code for performing correlation operations with respect to the received signal and multiple candidate transmitted signals, wherein each candidate transmitted signal comprises one of the set of possible preamble sequences, wherein each candidate transmitted signal corresponds to one of the reduced set of integer CFO candidates, and wherein correlation values are determined as a result of the correlation operations; and
    code for using the correlation values to identify the preamble sequence and to estimate the integer CFO, wherein the correlation operations are cross-correlation operations, wherein the cross-correlation operations are performed as $$C(z;j) = \sum_{b=1}^{B} \left| \sum_{m=(b-1)N_b+1}^{min(bN_b,M)} X(i_{s,m};j) * Y(i_{s,m}+z;j) \right|,$$

wherein z is an index for the reduced set of integer CFO candidates, wherein j is an index for the possible preamble sequences, wherein X( ) is the transmitted signal, wherein Y( ) is the received signal, wherein M is the length of the preamble sequence, wherein $i_{s,m}$ is a set of sub-carriers assigned to segment s, wherein $N_b$ is the number of samples of a partial correlation, and wherein $$B = \operatorname{ceil}\left(\frac{M}{N_b}\right).$$

40. The computer-program product of claim 31, wherein the computer-program product is included in a remote station in a wireless communication system that is configured for orthogonal frequency division multiplexing.

* * * * *